(12) United States Patent
Lai (10) Patent No.: US 8,027,576 B2
(45) Date of Patent: Sep. 27, 2011

(54) METHOD OF AND/OR APPARATUS FOR COUPLING A LENS PORT TO A HOUSING FOR AN UNDERWATER CAMERA

(75) Inventor: Yuk Shing Lai, Kowloon (HK)

(73) Assignee: Nauticam International Limited, Fo Tan (HK)

( * ) Notice: Subject to any disclaimer, the term of this patent is extended or adjusted under 35 U.S.C. 154(b) by 0 days.

(21) Appl. No.: 12/621,300

(22) Filed: Nov. 18, 2009

(65) Prior Publication Data
US 2010/0142936 A1    Jun. 10, 2010

Related U.S. Application Data

(60) Provisional application No. 61/116,014, filed on Nov. 19, 2008.

(51) Int. Cl.
*G03B 17/08* (2006.01)
(52) U.S. Cl. .......................................... 396/25; 348/81
(58) Field of Classification Search .................. 396/25, 396/27, 29; 348/81; 359/827, 828, 830
See application file for complete search history.

(56) References Cited

U.S. PATENT DOCUMENTS

| 4,994,829 A | * | 2/1991 | Tsukamoto | 396/27 |
| 5,177,515 A | * | 1/1993 | Tsukamoto | 396/27 |
| 6,089,761 A | * | 7/2000 | Sakurai | 396/531 |

FOREIGN PATENT DOCUMENTS

JP    55-127541    10/1980

OTHER PUBLICATIONS

International Search Report—PCT/GB2009/002677—Mar. 4, 2010.

* cited by examiner

*Primary Examiner* — W. B. Perkey
*Assistant Examiner* — Noam Reisner
(74) *Attorney, Agent, or Firm* — Young & Thompson (57) ABSTRACT

The invention comprises a method of and apparatus for coupling a lens port to a housing for an underwater camera. The method comprises the steps of providing an inwardly castellated ring and a co-operating outwardly castellated ring, the rings comprising part of or being positioned one on the housing and the other on the lens port. At least one of the rings is rotatable and the outwardly castellated ring can be passed through the inwardly castellated ring. Rotating at least one ring holds the outward castellations against the inward castellations to thereby hold the lens port to the housing.

19 Claims, 12 Drawing Sheets

METHOD OF AND/OR APPARATUS FOR COUPLING A LENS PORT TO A HOUSING FOR AN UNDERWATER CAMERA

BACKGROUND OF INVENTION

Underwater cameras are usually contained, whilst underwater in a waterproof housing to which a lens port is attached. The housing must be able to be connected to by a number of differing lens ports in the same way as a camera is able to receive a number of differing lenses. Thus the connection between the housing and the lens port must be temporary in nature but, as leakage can cause severe damage to the camera and the lens inside the housing, also be securely sealed. "O" rings are commonly used for this purpose.

Often a threaded connection is used but this method has the disadvantage that there is no indication to inform the user when to stop tightening the port. This often results in overtightening, which makes it difficult to remove the port from the housing.

Further some ports carry external knobs for the operation of the zoom and/or focus rings of the lens and the user needs to ensure that these knobs are in the position where the user finds them comfortable and convenient to use once the port is connected to the housing. To change the position of the knobs the relative position of the external threads and knobs must be changed. This can be achieved by loosening and relocating the screws on the lens port. However there may be upwards of sixteen such screws to undone relocate and re-tighten which makes the procedure time consuming.

In another form of connection bayonet tabs are used, there being for example three such tabs which pass through recesses in the front of the housing before the user rotates the port relative to the housing. This gives only limited choice of the position of the knobs. Also the friction between the port and housing is high due to the existence of the "O" ring, and therefore the lens port is difficult to turn, making insertion and removal of the lens port to and from the housing also difficult.

In a still further existing construction a pair of plastic clamps, 180 degrees apart are used as locking devices. Each plastic clamp contains a slot in which a screw is fitted to allow movement of the clamps in the direction parallel to the slot. The port can be inserted into the housing while the clamps are in an outward position, and the port then fixed into position by moving the clamps inwardly. The port is then securely locked to the housing as the port can only be removed by pulling out safety handles on the clamps and then moving the clamps outwardly. Although this method of locking the port to the housing does not require the user to turn the port relative to the housing the locking devices are situated outside the housing and are therefore more prone to damage, for example, by physical impact, when compared to other locking methods.

OBJECT OF THE INVENTION

It is an object of the invention to provide a method of and apparatus for locking a lens port to a housing and/or a lens port and/or a housing and/or a lens port and housing that ameliorates some of the foregoing disadvantages and limitations of the known art in a simple yet effective manner or which will at least provide the public with a useful choice.

SUMMARY OF INVENTION

In a first aspect the invention consists in a method of coupling a lens port to a housing for an underwater camera comprising the steps of providing an inwardly castellated ring and a co-operating outwardly castellated ring, the rings comprising part of or being positioned one on the housing and the other on the lens port, at least one of the rings being rotatable so that the outwardly castellated ring can be passed through the inwardly castellated ring, and rotating at least one ring to hold the outward castellations against the inward castellations to thereby hold the lens port to the housing.

Preferably, the outwardly castellated ring is mounted on or forms part of the lens port.

Preferably the inwardly castellated ring is mounted on or forms part of the housing.

Preferably the inwardly castellated ring is rotatable relative to the housing and has at least a toothed segment.

Preferably the toothed segment is outwardly facing.

Preferably a cog is provided to engage and move the toothed segment to rotate the inwardly castellated ring.

Preferably the cog is moved when a lever associated therewith is rotated.

In a further aspect the invention consists in apparatus for coupling a lens port to a housing, the lens port having a fixed outwardly castellated ring for use in a method according to any one of the preceding paragraphs.

In a still further aspect the invention consists in apparatus for coupling a lens port to a housing, a housing having a movable inwardly castellated ring for use in a method according to any one of the preceding paragraphs.

In a still further aspect the invention consists in apparatus for coupling a lens port to a housing, the lens port having a fixed outwardly castellated ring and the housing having a movable inwardly castellated ring both for use in a method according to any one of the preceding paragraphs.

Preferably the castellations in at least one of the castellated rings are tapered outwardly in the closing direction of movement between the outwardly facing castellations and the inwardly facing castellations.

To those skilled in the art to which the invention relates, many changes in construction and widely differing embodiments and applications of the invention will suggest themselves without departing from the scope of the invention as defined in the appended claims. The disclosures and the description herein are purely illustrative and are not intended to be in any sense limiting.

BRIEF DESCRIPTION

The invention will now be described, by way of example only, by reference to the accompanying drawings.

DESCRIPTION OF DRAWINGS

The following description will describe the invention in relation to preferred embodiments of the invention, namely a method of coupling a lens port to a housing and/or apparatus for coupling a lens port to a housing. The invention is in no way limited to these preferred embodiments as they are purely to exemplify the invention only and that possible variations and modifications would be readily apparent without departing from the scope of the invention.

Figure 1:
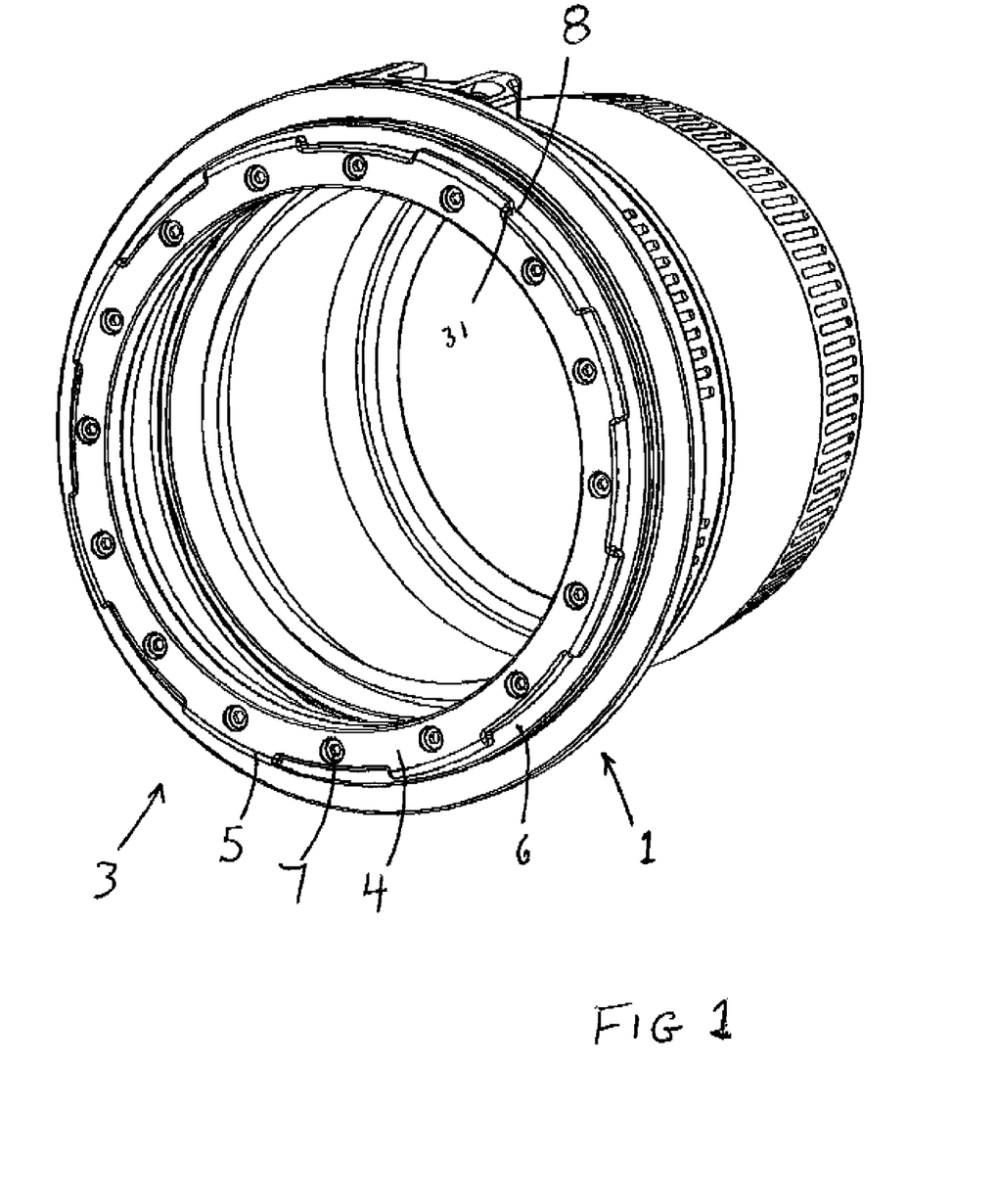
FIG. 1 is a perspective view of a lens port carrying apparatus for coupling the lens port to the housing according to a preferred embodiment of the invention.

FIG. 1 shows a lens port 1 which is able to receive a housing 2 and which lens port 1 in use receives the lens (not shown) of an underwater camera (not shown). The constructional and operational details of the lens port are not essential to this invention. However the lens port 1 carries at its end 3 a ring 4 which is castellated and which engages the housing 2. In the embodiment described herein the castellations 5 are outwardly directed. The ring 4 may be fixed to the face 6 at end 3 by fixing screws 7. The ring 4 is shaped so that the castellated parts are thinner than the thickness of the ring body so that when the ring 10 is mounted on the lens port 1 there is a gap 8 between the castellations 5 and the lens port 1.

The housing 2, which receives the body part of an underwater camera in use, carries a further ring 10 which has inwardly directed castellations such as castellations 11. The ring 10 is engaged with the housing in a manner such that ring 10 may rotate about its longitudinal axis. This may be achieved by providing a rebate 14 in the members defining the housing aperture. The ring 10 therefore sits in the rebate 14. Means are provided to retain the ring 10 in the rebate 14 and in the embodiment described this takes the form of three plates 15, 16 and 17 which are fixed to the body of the housing, for example by fixing screws such as screw 18. In the embodiment shown in FIG. 2 the ring 10 is thinner than the depth of the rebate 14 so the plates 15, 16 and 17 are provided with a flange such as flange 19 on plate 16 which is directed towards the ring 10. Fixing the ring 10 in position in this manner reduces friction on the ring 10 when ring 10 is being rotated.

Figure 2:
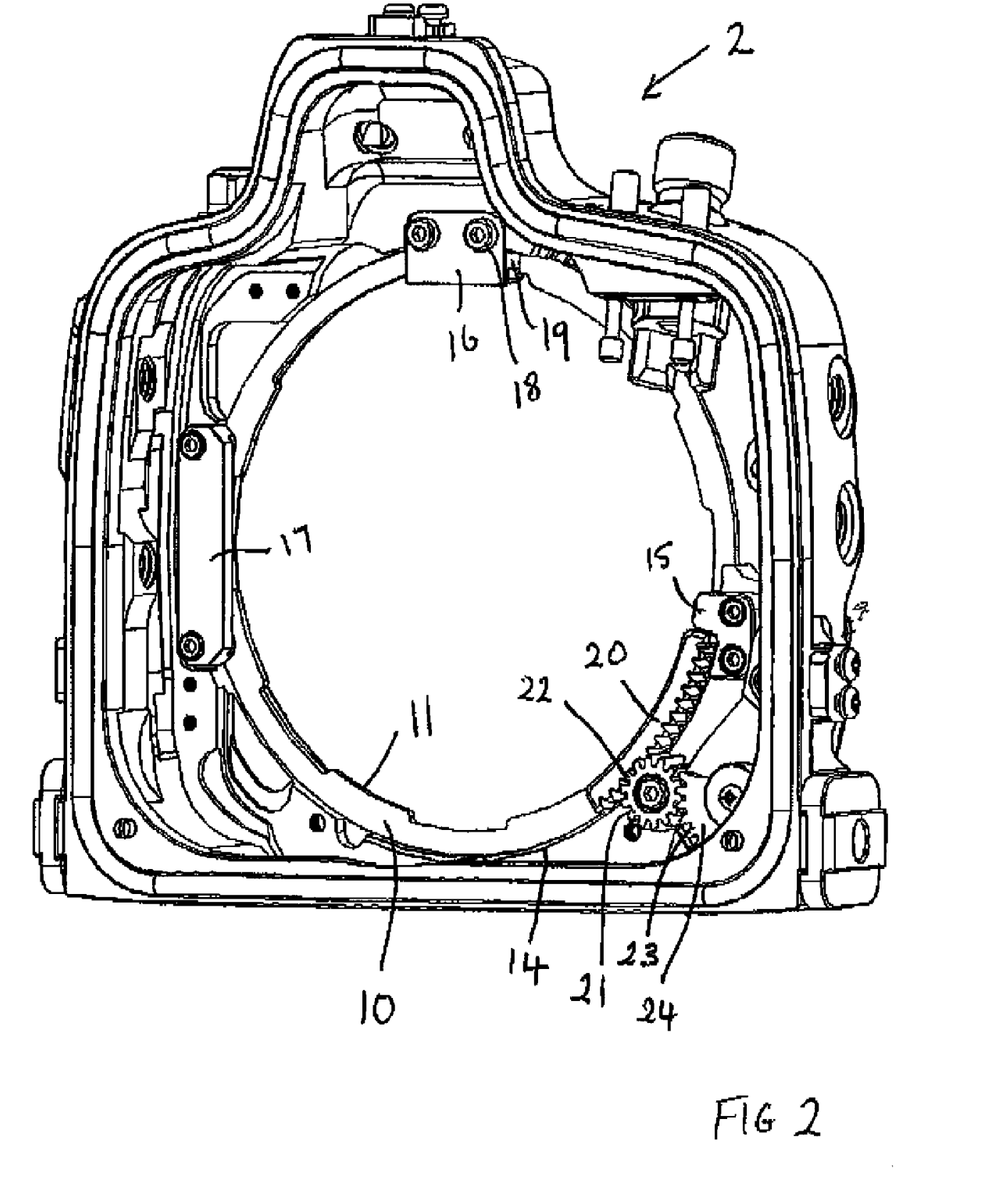
FIG. 2 is a perspective view of the front half of a camera housing for an underwater camera showing apparatus for coupling the housing to a lens port, in accordance with a preferred embodiment of the invention, the view being from inside the housing.

In order to rotate the ring 10 a mechanism operable from a position external to the housing 2 must be provided. This mechanism may comprise a toothed segment member 20 attached to the inward face of the ring 10 with respect to the housing 2. The length of the segment member 20 is longer than the length of the castellations 5 and 11.

A cog 21 is provided which has peripheral teeth 22 able to mesh with the teeth on segment member 20. The teeth 22 on cog 21 also meshes with teeth 23 provided on an intermediate cog segment 24 which is rotatably mounted on the housing 2. Thus when cog segment 24 rotates, cog 21 rotates and toothed segment member 20 is moved to rotate the ring 10.

Figure 5:
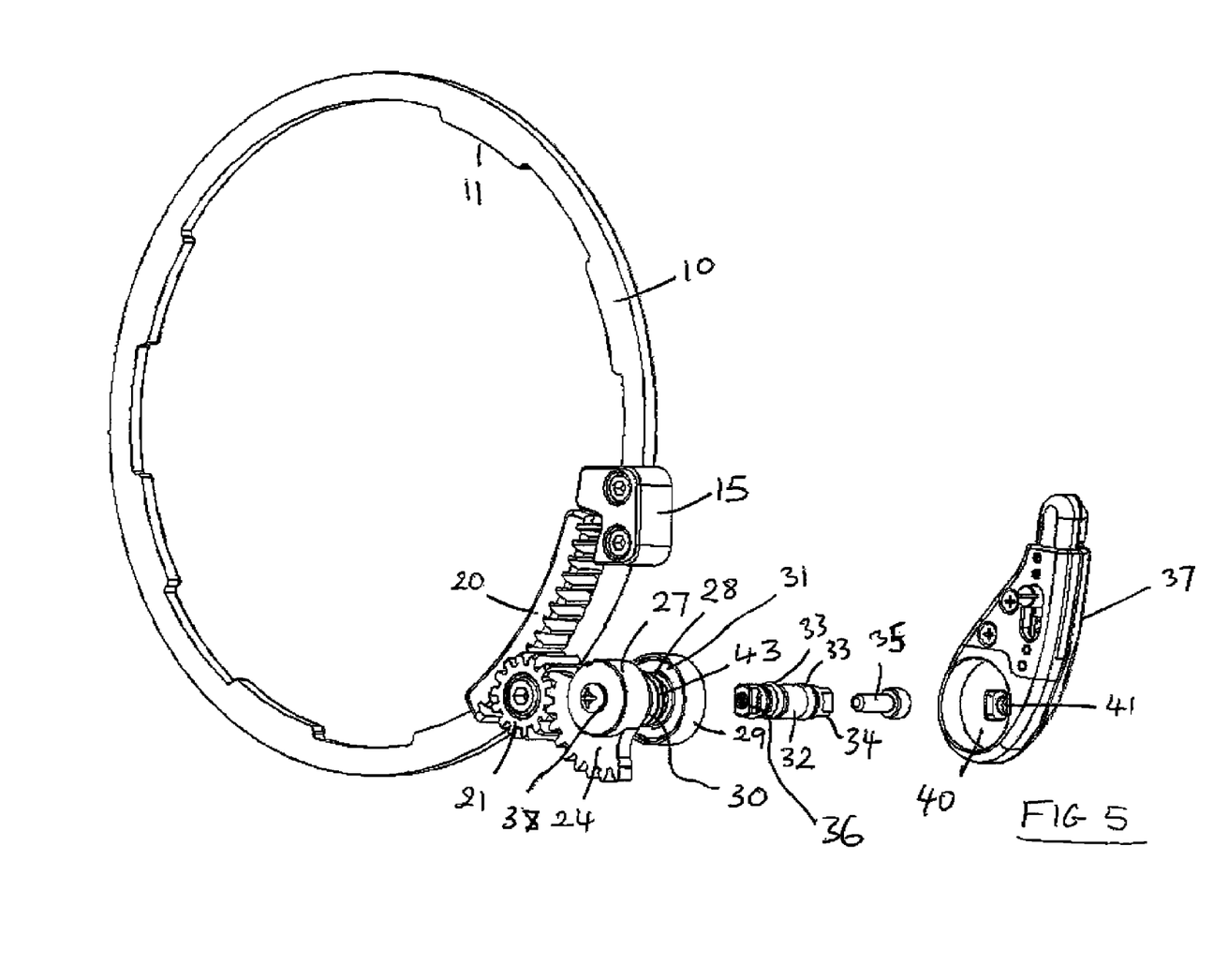
FIG. 5 is an exploded perspective view of the coupling mechanism as shown in FIG. 2 with the locking means in the locked position.
Figure 6:
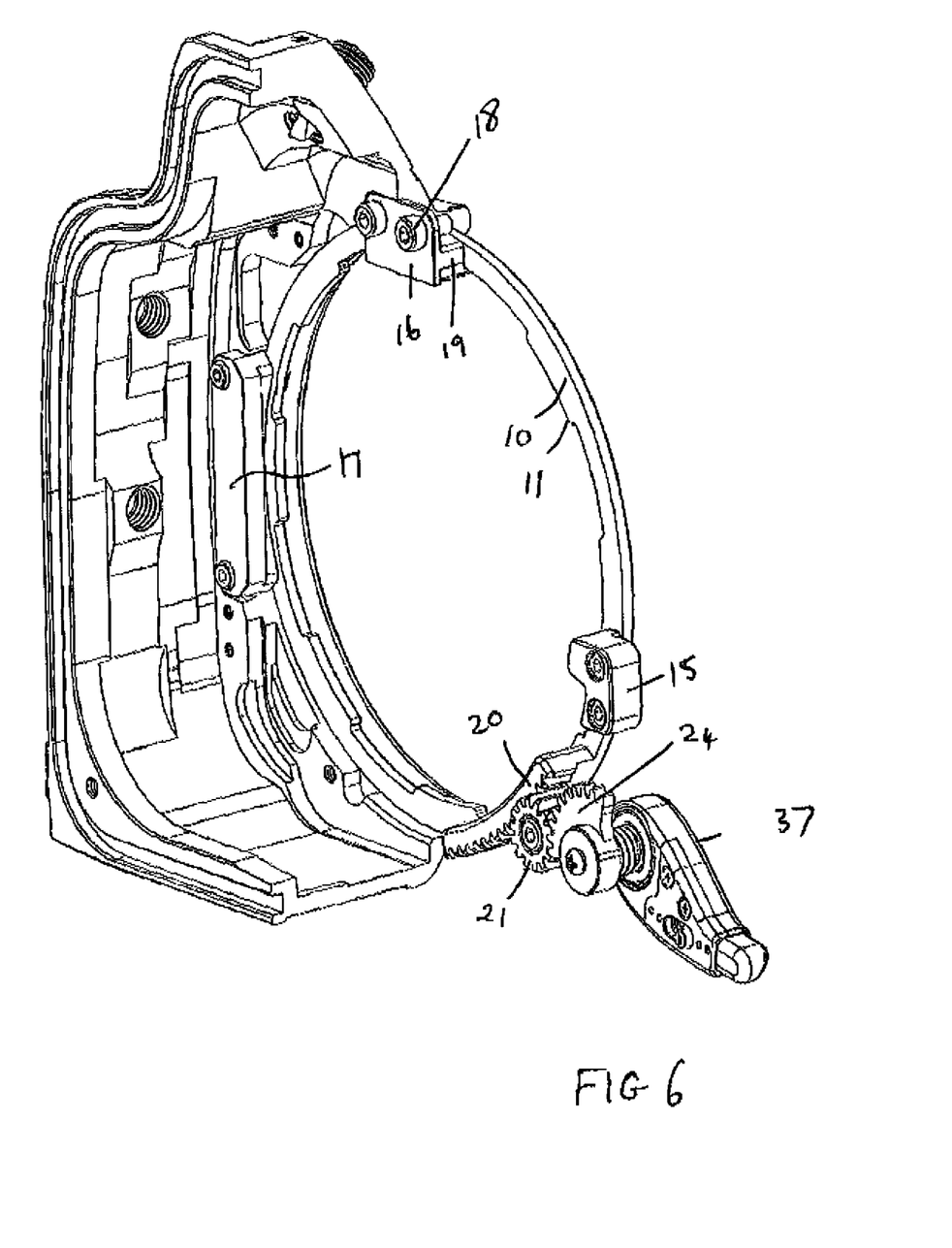
FIG. 6 is a perspective view showing the coupling device of FIG. 5 and part of the housing, with the locking means in the unlocked position.

The means to rotate the cog segment 24 can be seen in FIGS. 5 and 6 which show the cog segment 24 mounted on a collar 27. A further collar 28 with a central aperture and an end flange 29 is provided. The collar carries external threads 30 which enable the further collar 28 to be screwed into a correspondingly threaded aperture through the wall of housing 2. An "O-ring" 31 bears against the flange 29 to allow the further collar 28 to be sealed against the housing 2 against water ingress. Passing through the aperture of the further collar 28 is a shaft 32 which carries a pair of "O-rings" 33 to seal the shaft 32 inside the further collar 28 against water ingress. A lever 37 has a depression 40 to receive the end flange 29 of the further collar 28 and a further depression 41 to receive the end 34 of the shaft 32. Further depression 41 and the end 34 of shaft 32 are shaped to substantially prevent relative rotation for example by being square or rectangular or by providing flats as seen in FIG. 5. The shaft 32 is secured to the lever 37, for example, by a fixing screw 35.

The other end 36 of shaft 32 is engaged with the collar 27 again by being suitably shaped and can be fixed by a fixing screw 38. Therefore the shaft 32 can be rotated from a point exterior to the housing 2. As the shaft 32 mounts the lever 37 exterior to the housing by rotating the lever 37 about an axis formed by shaft 32 the shaft 32 is rotated, the intermediate cog segment 24 is rotated and the cog 21 is rotated causing the segment member 20 to move from the position shown in FIG. 5 to the position shown in FIG. 6 or vice versa. This has the effect of rotating ring 10 around its centre by a distance determined by the movement of segment member 20 which is sufficient to move castellations 11 at least substantially behind castellations 5 in use. If the construction were designed so that the lever 30 rotated anti-clockwise to unlock instead of clockwise as shown in the drawings the intermediate cog 21 would not be required as essentially its purpose is to change the direction of rotation of the segment member 20 with respect to the direction of rotation of the cog segment 24.

The dimensions of the rings 4 and 10 are such that the ring 4 may pass through the ring 10 with the castellations 5 passing through the gaps between castellations 11 and vice versa. However the castellations 11 are able to be positioned in a face abutting relationship to the castellations 5 by rotation of the ring 10 in the manner described above.

In the preferred form of the invention in order to ease the movement of the castellations 11 behind the castellations 5 in use the castellations 5 and/or the castellations 11, particularly the castellations 5, may be provided with rounded ends 31, or otherwise shaped to ease movement of the castellations 11 "behind" the castellations 5. This allows locking to occur even if the lens port is not quite fully inserted into the housing aperture.

Figure 9:
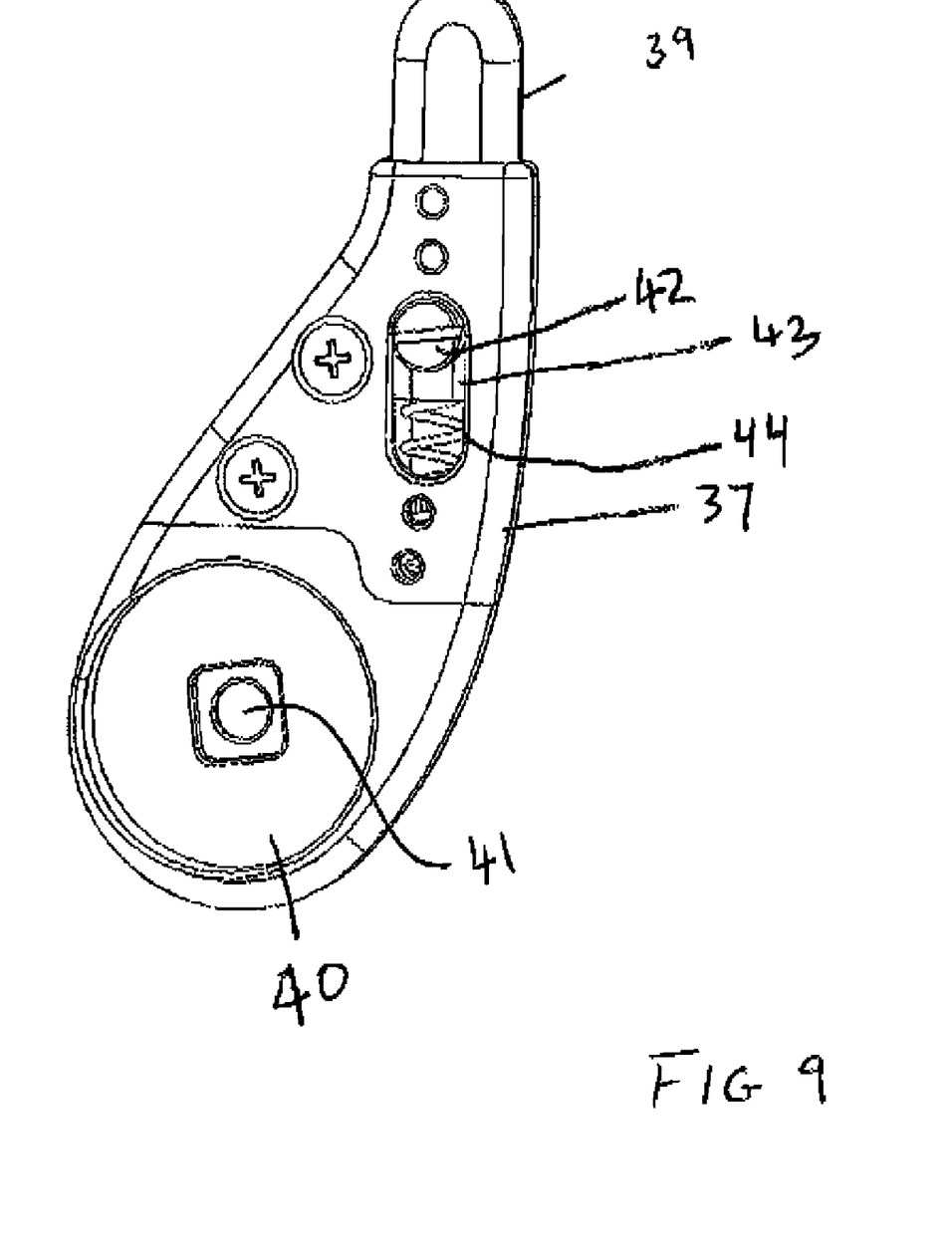
FIG. 9 is a rear elevation of a locking device forming part of a locking means according to a preferred form of the invention.
Figure 10:
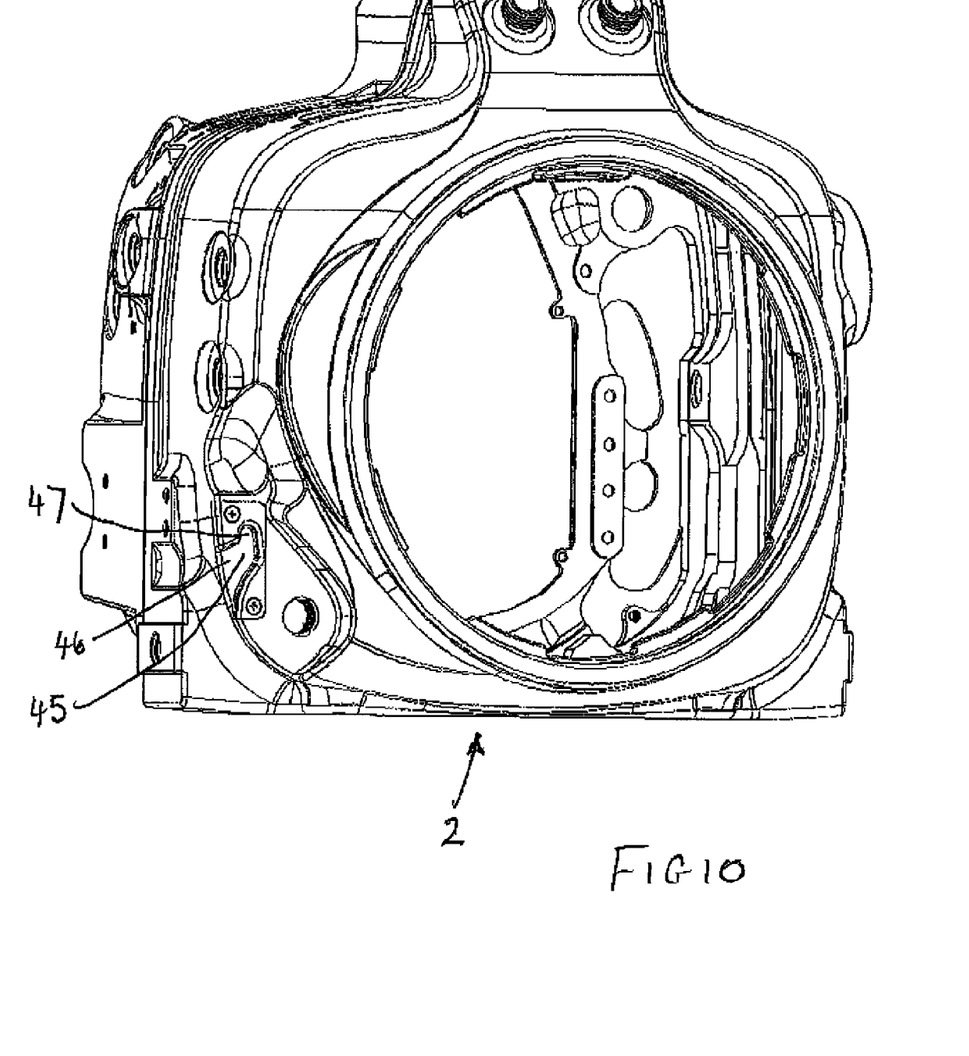
FIG. 10 is a view as in FIG. 3 with the locking device of FIG. 9 removed.
Figure 11:
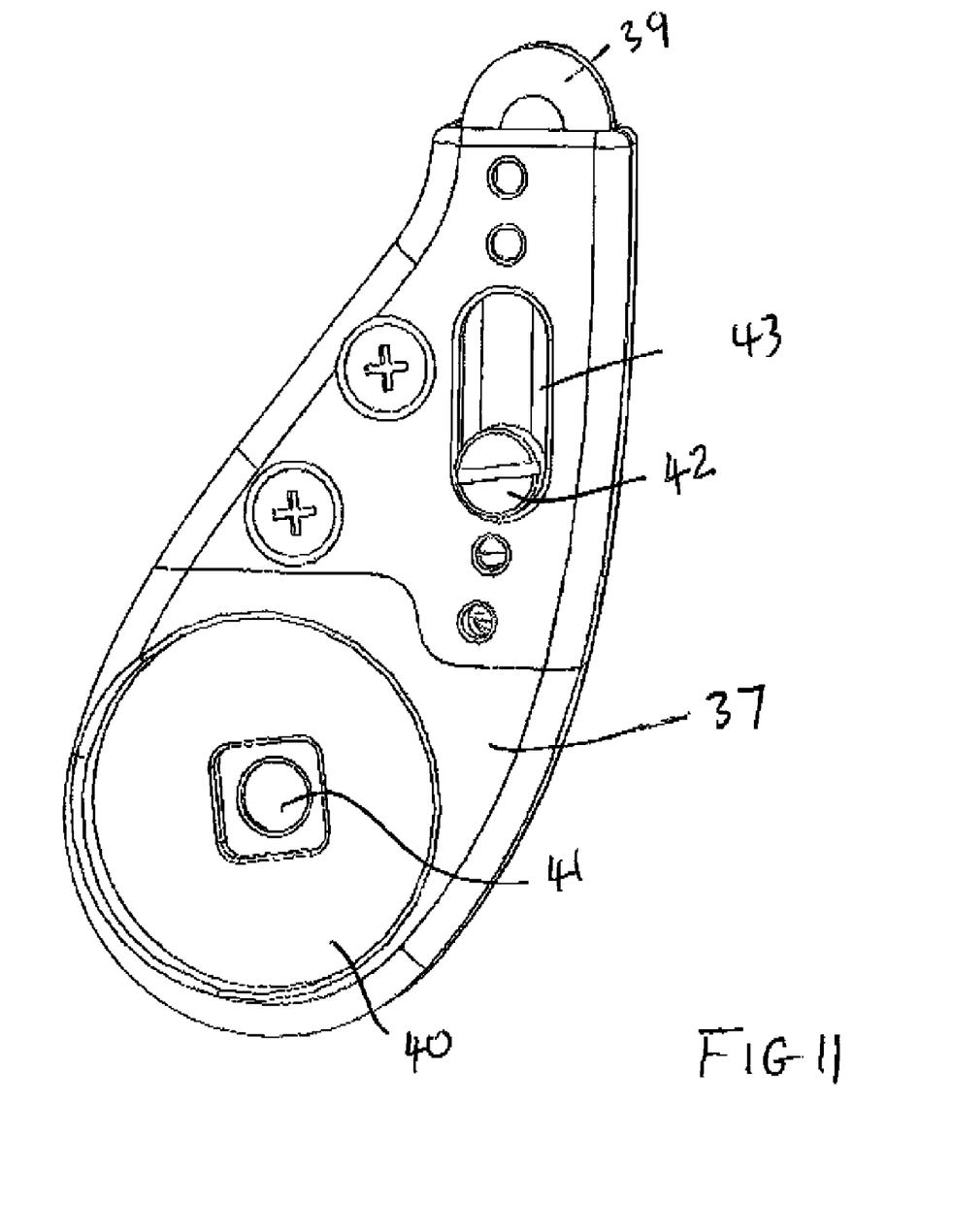
FIG. 11 is a view as in FIG. 9 with the locking device in an unlocked configuration.
Figure 12:
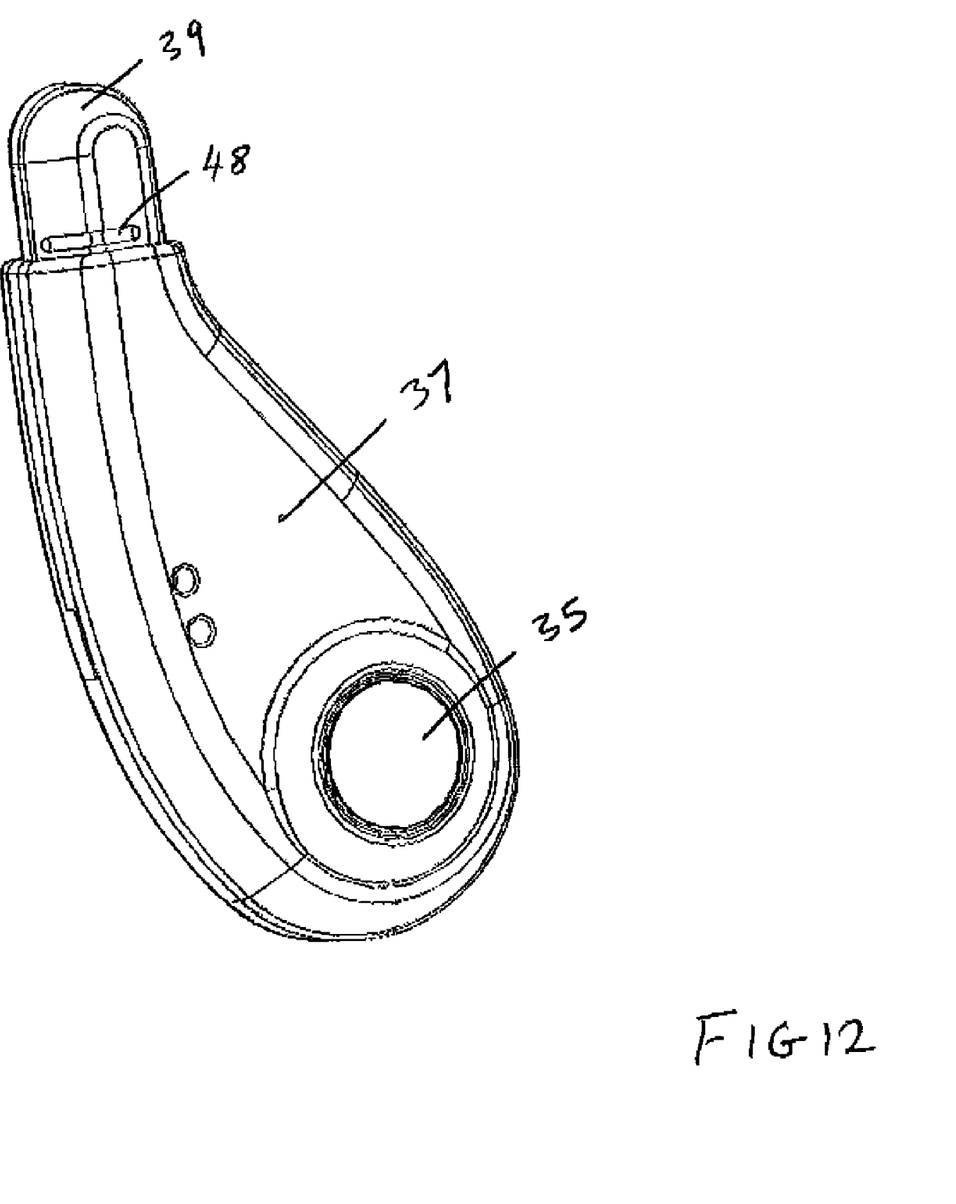
FIG. 12 is a front elevation of the locking device of FIG. 9.

Turning now to FIG. 9 the lever 37 has a safety or locking device which comprises a button 39 which extends outwardly from the lever 37. The lever 37 is hollow to accommodate the button 39 and associated mechanism. The part of the button 39 within the lever 37 carries a pin 42 which extends outwardly from the lever 37 through an aperture 43 in the wall of the lever 37. A spring 44 biases the pin 42 and button 39 to the positions shown in FIG. 9. Pushing the button 39 to the position shown in FIG. 11 will move the pin 42 to the position shown in FIG. 11.

The housing 2 has a recess 45 with a mouth 46 and a lobe shaped part 47. The shape of the recess 45 is such that the pin 42 when initially as shown in FIG. 9 and positioned in the lobe shaped part 47 of the recess 45 must be moved, by pressure on button 39 to the position shown in FIG. 11 to allow the pin 42 to move outwardly through the mouth 46 of the recess 45.

The button 39 has a line 48 marked thereon which is only visible if the pin 36 is in the lobe shaped part 47 of recess 45 thus indicating that the lever 37 is correctly locked into position.

Figure 3:
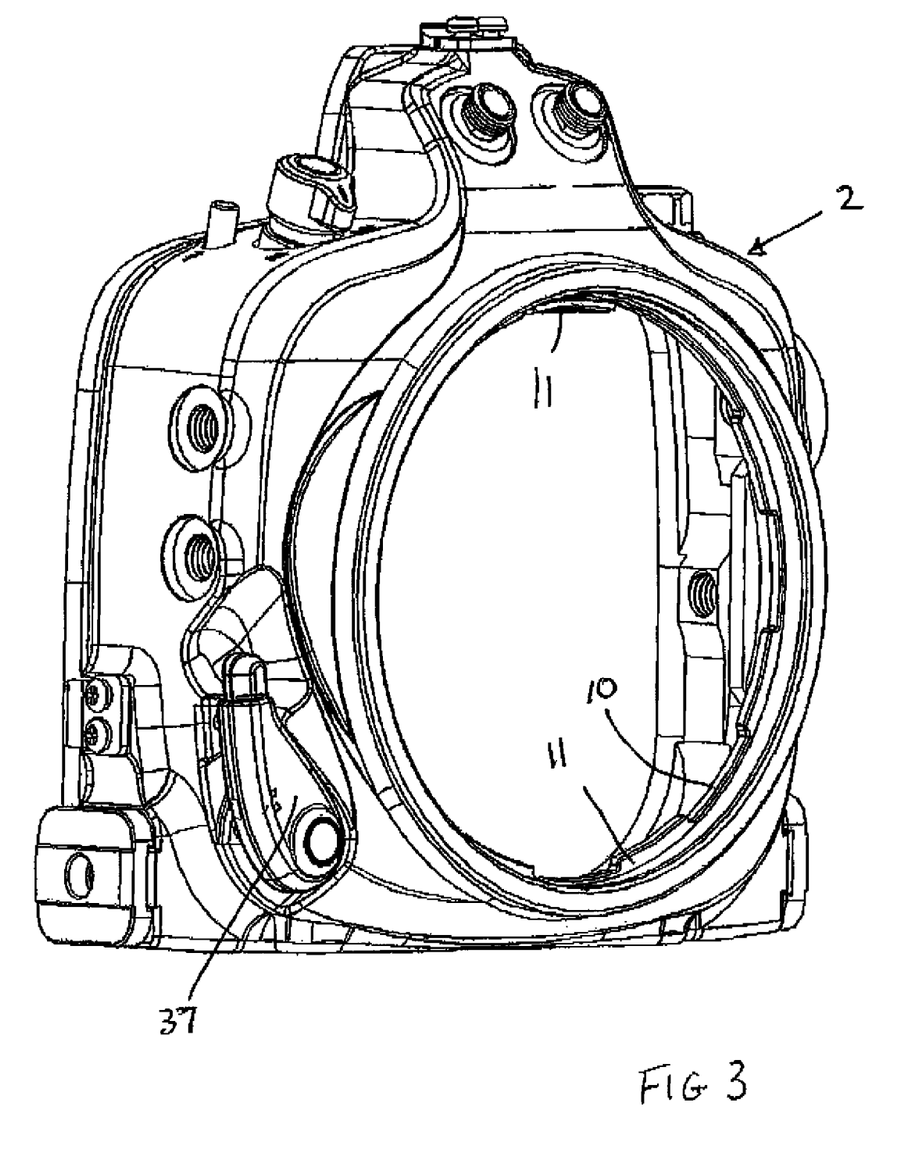
FIG. 3 is a perspective view of the housing of FIG. 2 seen from the front exterior of the housing, showing a locking means in the locked position.
Figure 4:
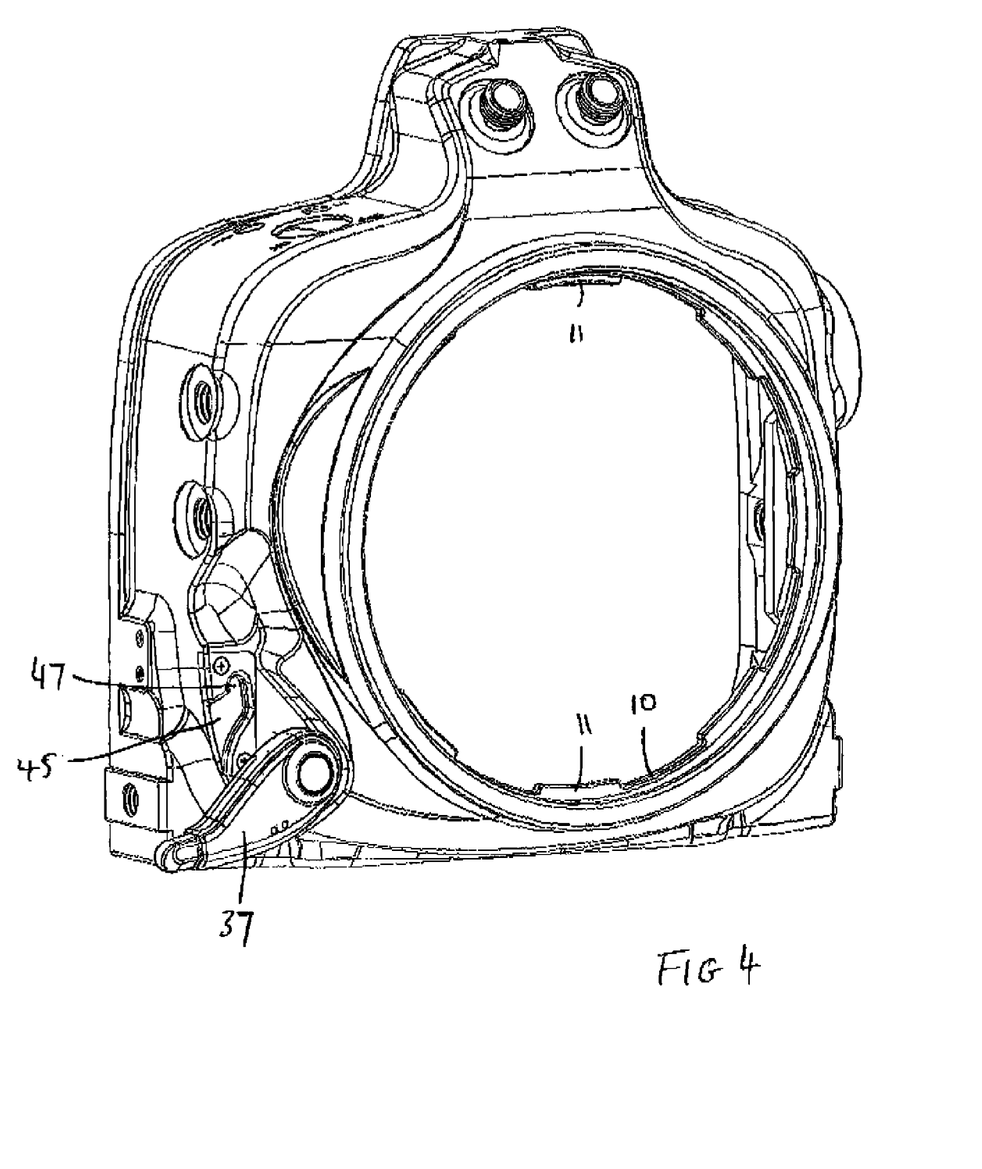
FIG. 4 is a view as for FIG. 3 showing the locking means in an unlocked position.
Figure 7:
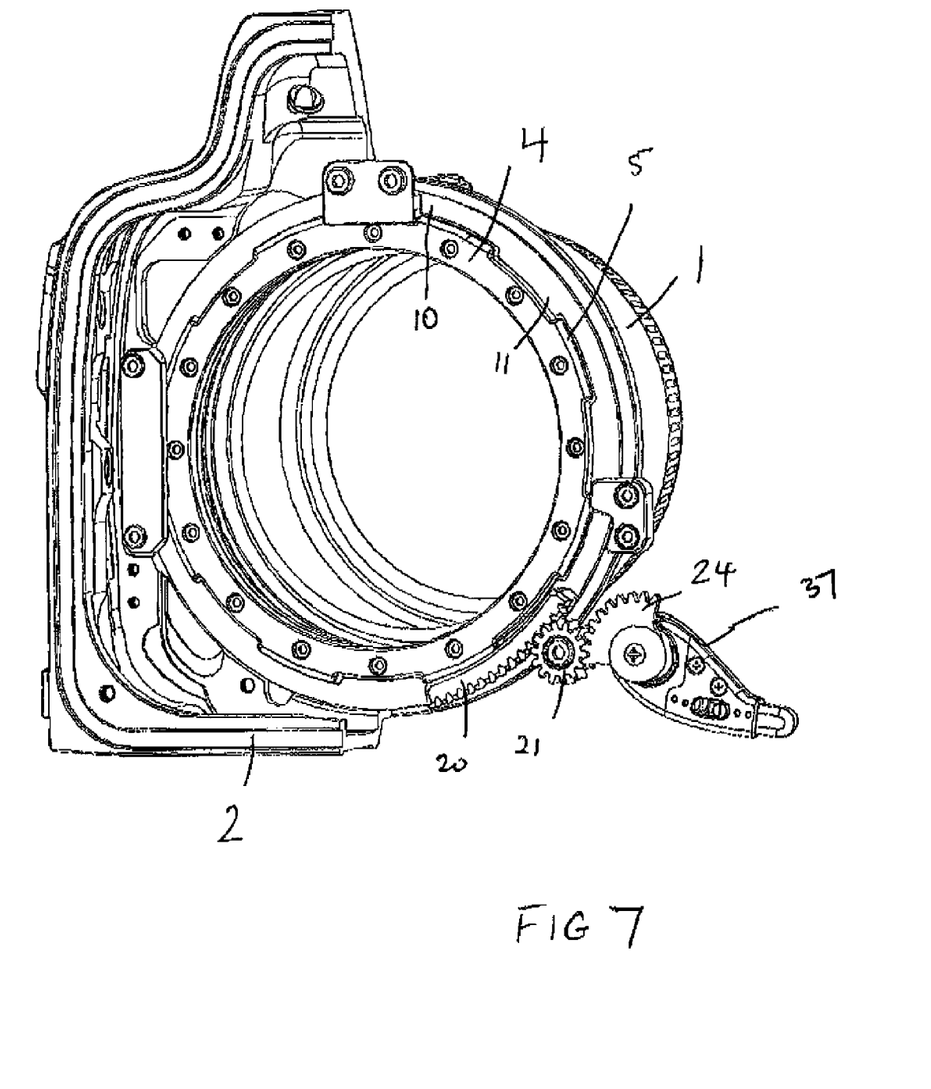
FIG. 7 shows the construction of FIG. 6 and the construction of FIG. 1 with the locking means in the unlocked position.
Figure 8:
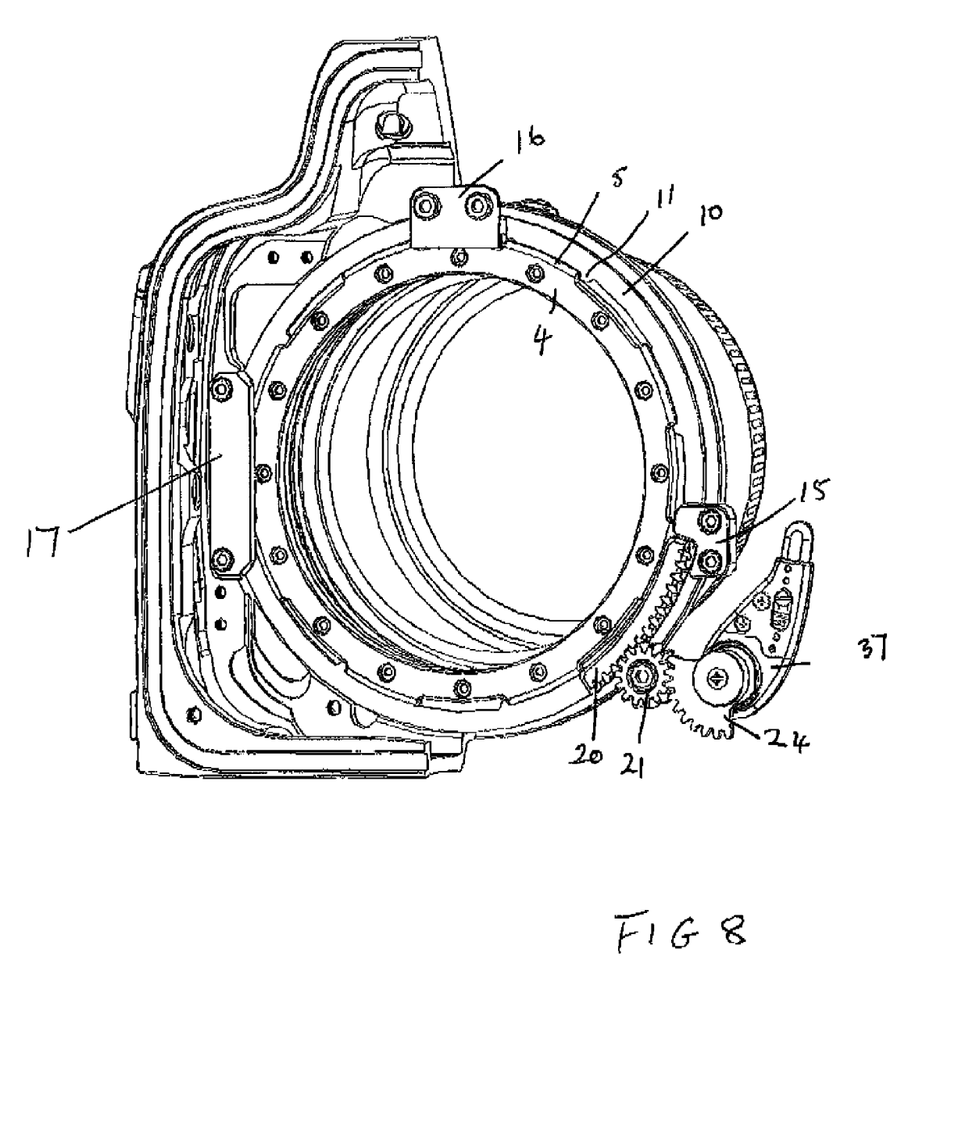
FIG. 8 is a view as in FIG. 7 with the locking means in the locked position.

In use the lever 37 is moved to the position shown in FIGS. 4 and 6. The castellations 5 are then passed through the gaps between castellations 11. Once this action is completed the lever 37 is rotated to the position shown in FIGS. 3 and 5. This causes the cog segment 24 to rotate, rotating the intermediate cog 21 and the segment member 20. Moving the segment member 20 causes the ring 10 to move from the position shown in FIG. 7 to the position shown in FIG. 8 locking the castellations 11 between the castellations 5 and the lens port 1. The castellations 11 are positioned in the gap 8. The lens port 1 can be removed from the housing 2 by reversing this set of steps.

ADVANTAGES a) The lens port can be easily engaged with and disengaged from the housing allowing a temporary connection but being able to ensure a tight connection between housing and port to minimise leakage past sealing devices, such as "O" rings therebetween.
b) The circumferential position of any knobs on the lens is able to be varied over a wide range of positions as the locking castellations can be inserted in one of a large number of options.
c) In the preferred form the lens port can be tightened onto the housing easily even if the lens port is not quite fully inserted at the time the locking procedure is commenced.

VARIATIONS

The invention has been described with the ring and castellations provided on the lens port passing through the ring on the housing. This could be reversed but would be more complicated and would not be in accordance with current lens port/housing design. Also the moving ring could be provided on the lens port and the fixed ring on the housing but again this would add complications as the mechanism to rotate the ring would of necessity be more complicated. The number of castellations could be increased or decreased. More castellations would give more available positions for engagement of the lens port to the housing, and less castellations would reduce the available number of positions.

Throughout the description of this specification, the word "comprise" and variations of that word such as "comprising" and "comprises", are not intended to exclude other additives, components, integers or steps.

What I claim is:

1. A method of coupling a lens port to a housing for an underwater camera comprising the steps of:
    providing an inwardly castellated ring and a co-operating outwardly castellated ring, the rings comprising part of or being positioned one on the housing and the other on the lens port, the inwardly castellated ring being rotatable relative to the housing so that the outwardly castellated ring can be passed through the inwardly castellated ring;
    rotating the inwardly castellated ring to hold the outward castellation against the inward castellations to thereby hold the lens port to the housing; and
    wherein the inwardly castellated ring is mounted on or forms part of the housing.

2. The method as claimed in claim 1, wherein the outwardly castellated ring is mounted on or forms part of the lens port.

3. The method as claimed in claim 1, wherein the inwardly castellated ring has at least a toothed segment.

4. The method as claimed in claim 3, wherein the toothed segment is outwardly facing.

5. The method as claimed in claim 3, wherein a cog is provided to engage and move the toothed segment to rotate the inwardly castellated ring.

6. The method as claimed in claim 5, wherein the cog is moved when a lever associated therewith is rotated.

7. An apparatus for coupling a lens port to a housing, the lens port having a fixed outwardly castellated ring for use in a method according to claim 1.

8. An apparatus for coupling a lens port to a housing, a housing having a movable inwardly castellated ring for use in a method according claim 1.

9. An apparatus for coupling a lens port to a housing, the lens port having a fixed outwardly castellated ring and the housing having a movable inwardly castellated ring both for use in a method according claim 1.

10. The apparatus for coupling as claimed in claim 9, wherein the castellations in at least one of the castellated rings are tapered outwardly in the closing direction of movement between the outwardly facing castellations and the inwardly facing castellations.

11. The method as claimed in claim 2, wherein the inwardly castellated ring has at least a toothed segment.

12. The method as claimed in claim 1, wherein the inwardly castellated ring has at least a toothed segment.

13. The method as claimed in claim 4, wherein a cog is provided to engage and move the toothed segment to rotate the inwardly castellated ring.

14. An apparatus for coupling a lens port to a housing, the lens port having a fixed outwardly castellated ring for use in a method according to claim 2.

15. An apparatus for coupling a lens port to a housing, the lens port having a fixed outwardly castellated ring for use in a method according to claim 1.

16. An apparatus for coupling a lens port to a housing, the lens port having a fixed outwardly castellated ring for use in a method according to claim 3.

17. An apparatus for coupling a lens port to a housing, the lens port having a fixed outwardly castellated ring for use in a method according to claim 4.

18. An apparatus for coupling a lens port to a housing, the lens port having a fixed outwardly castellated ring for use in a method according to claim 5.

19. An apparatus for coupling a lens port to a housing, the lens port having a fixed outwardly castellated ring for use in a method according to claim 6.

* * * * *